United States Patent
Song et al.

(10) Patent No.: US 7,796,743 B2
(45) Date of Patent: Sep. 14, 2010

(54) METHOD AND SYSTEM FOR IMPLEMENTING RING BACK TONE

(75) Inventors: Yong Song, Shenzhen (CN); Qian Yu, Shenzhen (CN); Junsong Yi, Shenzhen (CN); Bing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 11/793,127

(22) PCT Filed: Dec. 19, 2005

(86) PCT No.: PCT/CN2005/002242

§ 371 (c)(1),
(2), (4) Date: Mar. 19, 2008

(87) PCT Pub. No.: WO2006/066495

PCT Pub. Date: Jun. 29, 2006

(65) Prior Publication Data

US 2008/0273681 A1 Nov. 6, 2008

(30) Foreign Application Priority Data

Dec. 20, 2004 (CN) .................. 2004 1 0104443

(51) Int. Cl.
*H04M 3/42* (2006.01)
*H04M 7/00* (2006.01)

(52) U.S. Cl. ............... 379/201.02; 379/87; 379/207.02; 379/207.16; 379/221.08; 379/221.09; 379/221.11; 379/221.12; 379/373.03; 379/373.04; 455/414.1

(58) Field of Classification Search ............ 379/201.01, 379/201.02, 207.02, 207.16, 221.08, 221.09, 379/221.11, 221.12, 373.01–376.01, 87; 455/414.1
See application file for complete search history.

(56) References Cited

U.S. PATENT DOCUMENTS 7,174,009 B1 * 2/2007 Zhang et al. ........... 379/221.01

(Continued)

FOREIGN PATENT DOCUMENTS

CN  1294811 A  5/2001

(Continued)

OTHER PUBLICATIONS

W. Yulong and L. Jianxin, "WIN subscriber CRBT service solution," *Modern Science & Technology of Telecommunications*, Jan. 2004, 5 pages, Issue One.
"Ushering in a new era of CRBT service—solution to CRBT services of Alcatel Shanghai Bell," *China Electronics News*, May 18, 2004, 2 pages.

(Continued)

*Primary Examiner*—Harry S Hong

(57) ABSTRACT

A method for implementing a ring back tone, including: receiving, by a first Service Control Point, an intelligent service request triggered by a Service Switching Point, based on a call of a calling party; obtaining personal ring back tone information of a called party and/or group ring back tone information of a group which the called party belongs to; acquiring first ring back tone information according to the personal ring back tone information and/or the group ring back tone information delivering a connect message containing the first ring back tone information to the Service Switching Point the connect message being used to instruct the Service Switching Point to connect the call to an Advanced Intelligent Peripheral for playing the ring back tone to the calling party according to the first ring back tone information.

10 Claims, 6 Drawing Sheets

U.S. PATENT DOCUMENTS

2005/0243989 A1* 11/2005 Lee et al. ............... 379/207.16
2008/0031440 A1* 2/2008 Kong ................... 379/221.09

FOREIGN PATENT DOCUMENTS

| CN | 1507290 A | 6/2004 |
| CN | 1545347 A | 11/2004 |
| WO | WO 2004/016015 A1 | 2/2004 |
| WO | WO 2004/023829 A1 | 3/2004 |
| WO | WO 2004/095817 A1 | 11/2004 |
| WO | WO 2006/066495 A1 | 6/2006 |

OTHER PUBLICATIONS

Written Opinion of the International Searching Authority dated Feb. 16, 2006 in connection with International Patent Application No. PCT/CN2005/002242.

Communication pursuant to Article 94(3) EPC dated May 20, 2008 in connection with European Patent Application No. 05819599.1.

Supplementary European Search Report dated Nov. 21, 2007 in connection with European Patent Application No. 05819599.

International Search Report dated Feb. 16, 2006 in connection with International Patent Application No. PCT/CN2005/002242.

* cited by examiner

METHOD AND SYSTEM FOR IMPLEMENTING RING BACK TONE

FIELD OF THE INVENTION

The present invention relates to the field of communication technology, in particular, relates to a method and a system for implementing a ring back tone.

BACKGROUND OF THE INVENTION

The primary characteristic of customized ring back tone service lies in that a piece of melodious music or other especial sound or voice is used to replace the existing tedious ring. When other users call a subscriber who has customized a ring back tone, what they hear will be the customized ring back tone, rather than a conventional ring. The ring back tone service makes mobile operators take the lead in providing individualized and differentiated services and helps to promote corporate images of the operators. The allure of the ring back tone service to individual users lies in that the users may enjoy a sufficiently individualized space, and at the same time, an open network capability.

At present, the ring back tone solutions mainly include intelligent network solutions and non-intelligent network solutions. The intelligent network solutions are widely used, for they are less dependent on network equipment and can be deployed faster.

The existing intelligent network solutions are based on personal ring back tone services, and the ring back tone services provided by operators are substantially directed to the ring back tone services prepaid by individual subscribers. The intelligent network solutions are realized by the Specialized Resource Function (SRF) capacity and the signaling processing capacity of an Advanced Intelligent Peripheral (AIP). The networking of a ring back tone system of the intelligent network solutions is shown in FIG. 1. The symbols are explained as follows:

Service Switching Point (SSP): for triggering a service to a Service Control Point (SCP) and transferring a call to an AIP.

Service Control Point (SCP): for authenticating whether a user has customized a ring back tone service, controlling a calling procedure of the service, and obtaining a Mobile Station Roaming Number (MSRN) and status information of the user from a Home Location Register (HLR), as well as instructing the SSP to route the call to the AIP and completing the play of an individualized ring back tone.

Service Management Point (SMP): for managing the SCP and functioning as a server of MML (Man Machine Language) command.

Advanced Intelligent Peripheral (AIP): for storing codes of a ring back tone customized by a user and ring back tone voice files, playing a ring back tone to a calling party, implementing voice flow of ring back tone customization and management, and providing interfaces for ring back tone customization and management to a Service Provider (SP) via an AIP Web Server.

Service Provider (SP): responsible for providing abundant ring back tone content and providing various means, such as WEB and WAP, for users to manage and customize an individualized ring back tone in a self-supporting way.

According to the networking of the ring back tone system as shown in FIG. 1, a voice channel alternative calling method of a ring back tone is provided in the prior art. A schematic flow chart of this method is shown in FIG. 2, and signaling interactions of this method are shown in FIG. 3. The processes are as follows:

1. A user calls an intelligent subscriber who has activated a ring back tone service, and upon receiving the call, a Mobile Switching Center (MSC) of the calling end connects the call to an SSP according to the number segment or T-CSI (Terminating CAMEL Subscription Information) of the called party;

2. The SSP triggers an intelligent service request by sending an IDP (Initial Detect Point) message to an SCP which the called party belongs to;

3. In the case that the called party is a ring back tone subscriber, the SCP which the called party belongs to initiates an ATI (Any Time Interrogation) to an HLR of the called party and queries a current state of the called party; when the called party is in an idle state, GMSC (Gateway Mobile Switching Center)/MSC/SCP delivers RRBE (Request Report BCSM Event) and CONECT which indicates a special route prefix will be added to the called number; when the called party is in a busy state or a not-reachable state, a Continue message which indicates the call will be continued in the original mode is delivered; and in the case that the called party is not a ring back tone subscriber, the SCP which the called party belongs to delivers a signaling according to signaling specifications of the current network;

4. The SSP routes the call to an AIP based on the route prefix of the called number;

5. The AIP registers the incoming call as a ring back tone service incoming call, removes the route prefix of the roaming number and the parameters such as the number of times the call has been attempted and forwarded, sends an IAM (Initial Address Message) signaling to the called end office and connects the call to an MSC of the called end;

6. After the MSC of the called end pages and finds the called party, the MSC of the called end returns an ACM (Address Complete Message) to the AIP; upon receiving the ACM, the AIP blocks the common ring played by the called end office and plays the ring back tone customized by the called party to the calling party based on such conditions as MSISDN (Mobile Station International ISDN Number) number and calling number;

7. After the called party answers, a reply signal is sent to the AIP; the AIP transparently transmits the reply signal to the calling office, stops playing the ring back tone, and connects the calling voice channel and the called voice channel to start a conversation;

8. After the conversation ends, the called party releases the call first; the SSP reports a hang up event and the SCP releases the call.

According to the networking of the ring back tone system as shown in FIG. 1, a non-voice channel alternative calling method of a ring back tone is provided in the prior art. A schematic flow chart of this method is shown in FIG. 4, and signaling interactions of this method are shown in FIG. 5. The processes are as follows:

1. A user calls an intelligent subscriber who has activated a ring back tone service, and upon receiving the call, an MSC of the calling end connects the call to an SSP according to the number segment or T-CSI of the called party;

2. The SSP sends an IDP message to an SCP which the called party belongs to trigger an intelligent service;

3. The SCP which the called party belongs to delivers a special route prefix according to AIP address information; the SSP routes the call to the AIP based on the route prefix preceding the called number and sends an IAM signaling to the called end office according to the called roaming number to connect the call to an MSC of the called end;

4. The MSC of the called end returns a reply signaling to the SSP and the SSP sends a Play Ring Back Tone instruction to the AIP;

5. The AIP plays a ring back tone to the calling party according to the Play Ring Back Tone instruction;

6. After the called party answers, a reply signal ANM (Answer Message) is sent to the SSP; and the SSP disconnects the link to the AIP and connects the calling voice channel and the called voice channel to start a conversation;

7. After the conversation ends, the called party releases the call first; the SSP reports a hang up event and the SCP releases the call;

8. The call is cleared.

The above two methods are both designed to meet the demand for ring back tone service from individual subscribers, and the demand for ring back tone service from groups after the development of Mobile Virtual Private Network (MVPN) is not considered. Moreover, after a subscriber who has applied for a personal ring back tone joins a group, its personal ring back tone becomes invalid when it acts as a called subscriber in MVPN callings.

SUMMARY OF THE INVENTION

The disclosed embodiments of the invention provide a method and system for implementing a ring back tone, so that the existing intelligent network ring back tone technology provides group ring back tone and after a user who has applied for a personal ring back tone joins a group service, its personal ring back tone is still valid.

A method for implementing a ring back tone, including: receiving, by a first Service Control Point, an intelligent service request triggered by a Service Switching Point, based on a call of a calling party; obtaining personal ring back tone information of a called party and/or group ring back tone information of a group which the called party belongs to; acquiring a first ring back tone information according to the personal ring back tone information and/or the group ring back tone information; delivering a connect message containing the first ring back tone information to the Service Switching Point, the connect message being used to instruct the Service Switching Point to connect the call to an Advanced Intelligent Peripheral for playing the ring back tone to the calling party according to the first ring back tone information.

A system for providing a ring back tone, including: a Service Switching Point, configured to trigger an intelligent service request to a first Service Control Point based on a call of a calling party; the first Service Control Point, configured to receive the intelligent service request triggered by the Service Switching Point, obtain personal ring back tone information of a called party and/or group ring back tone information of a group which the called party belongs to, acquire a first ring back tone information according to the personal ring back tone information and/or the group ring back tone information, deliver a connect message containing the first ring back tone information to the Service Switching Point, the connect message being used to instruct the Service Switching Point to connect the call to an Advanced Intelligent Peripheral; the Advanced Intelligent Peripheral, configured to play the ring back tone to the calling party according to the first ring back tone information.

A service control device, including: a receiving unit, configured to receive an intelligent service request triggered by a Service Switching Point based on a call of a calling party; an obtaining unit, configured to obtain personal ring back tone information of a called party and/or group ring back tone information of a group to which the called party belongs, based on the call; an acquiring unit, configured to acquire a first ring back tone information according to the personal ring back tone information and/or the group ring back tone information; a delivering unit, configured to deliver a connect message containing the first ring back tone information to the Service Switching Point, the connect message being used to instruct the Service Switching Point to connect the call to an Advanced Intelligent Peripheral for playing the ring back tone to the calling party according to the first ring back tone information.

The schemes of the embodiments have no adverse impact on the personal ring back tone service. When a personal ring back tone subscriber joins a group ring back tone service, if a group ring back tone is not available, the personal ring back tone subscriber may use a personal ring back tone; if a group ring back tone is activated, the personal ring back tone subscriber may preset the priority between the group ring back tone and the personal ring back tone. As a result, the schemes of the invention embodiments can provide ring back tone service for both an individual subscriber and a group subscriber and the schemes needs no device reconstruction of the existing network. Therefore, such a combination of ring back tone service is convenient to implement and costs less.

DETAILED DESCRIPTION OF THE EMBODIMENTS

In addition to providing abundant personal services, such as prepaid services, a Mobile Intelligent Network can also provide Mobile Virtual Private Network (MVPN) services. The MVPN service is also referred to as Virtual Private Mobile Network (VPMN) service, in which a logical voice channel private network is built on a Public Land Mobile Network (PLMN) and a Public Switched Telephone Network (PSTN), and enterprise users and group users may be interrelated to each other by means of a private numbering plan and a series of special functions such as billing, managing and operating may be provided.

Figure 1:
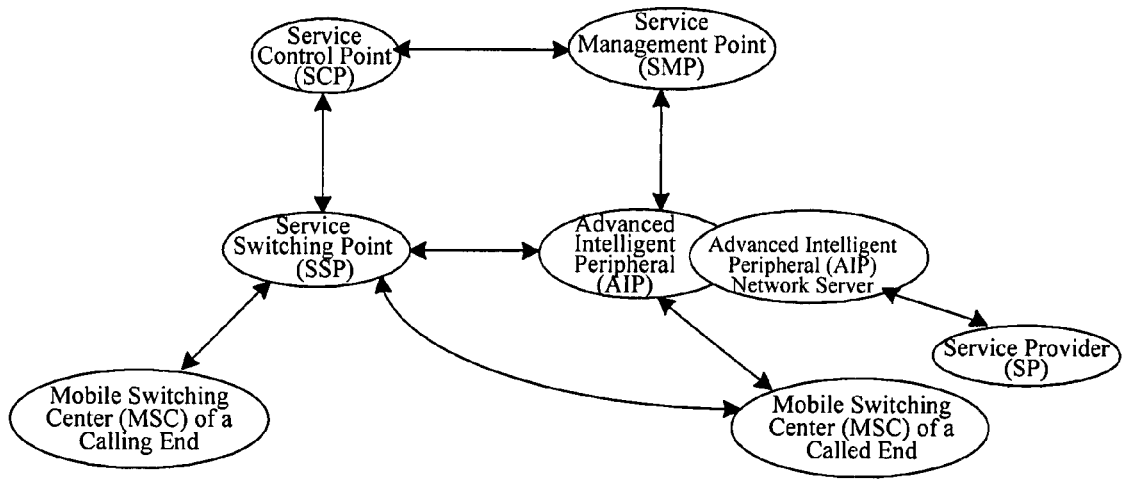
FIG. 1 is a networking diagram of a ring back tone system in the prior art.
Figure 2:
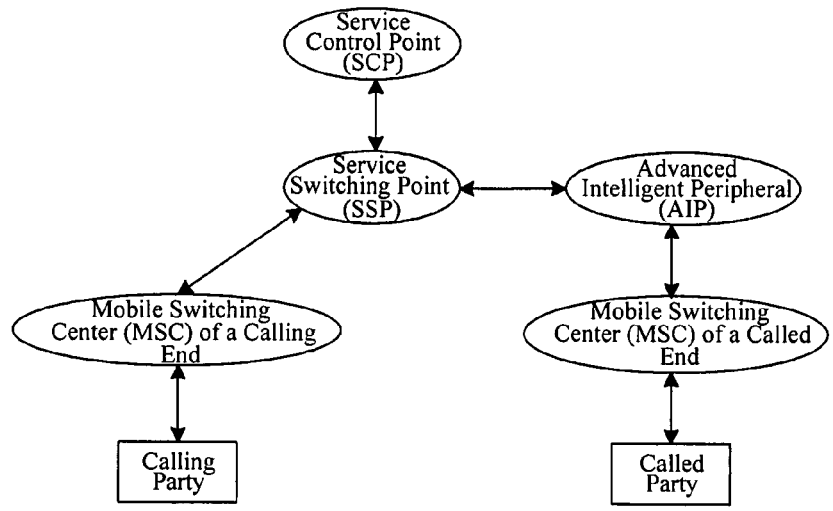
FIG. 2 is a schematic flow chart of a voice channel alternative calling method of a ring back tone in the prior art.
Figure 3:
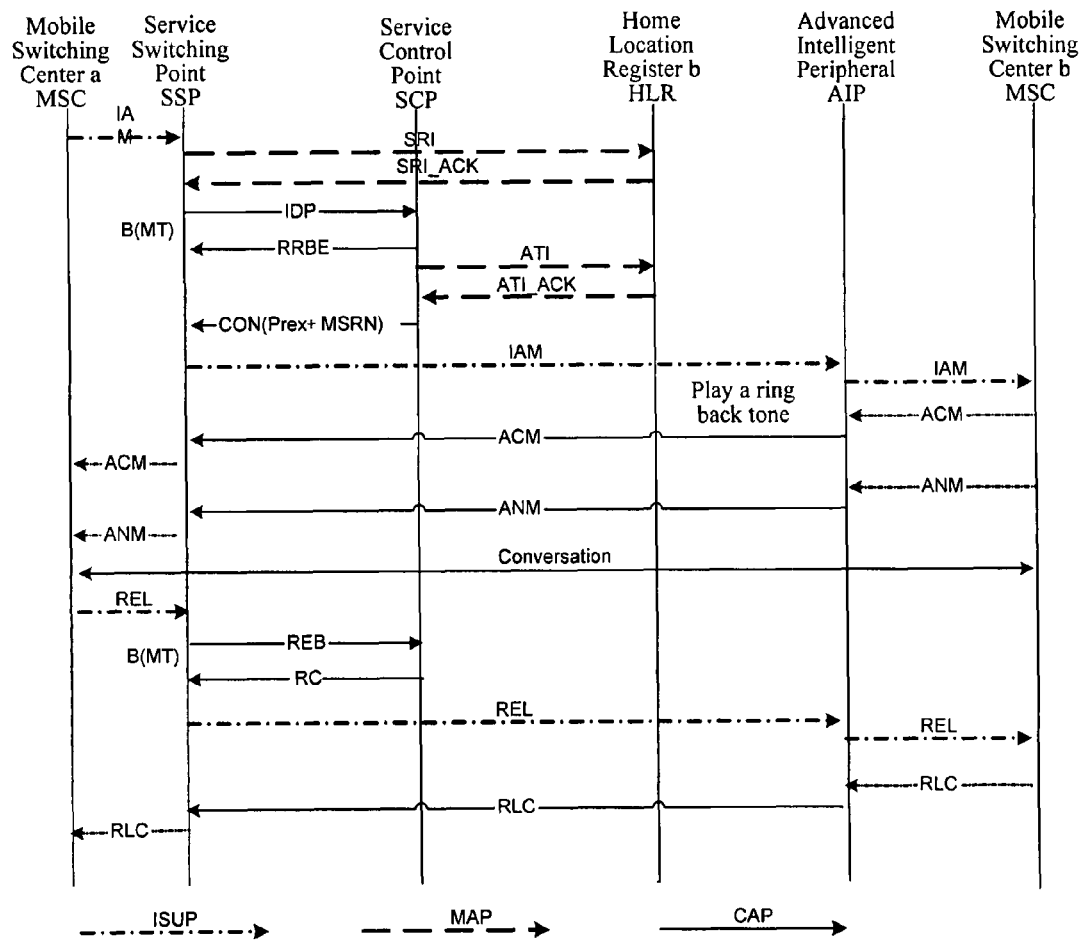
FIG. 3 is a schematic diagram of voice channel alternative calling signaling interactions of a ring back tone in the prior art.
Figure 4:
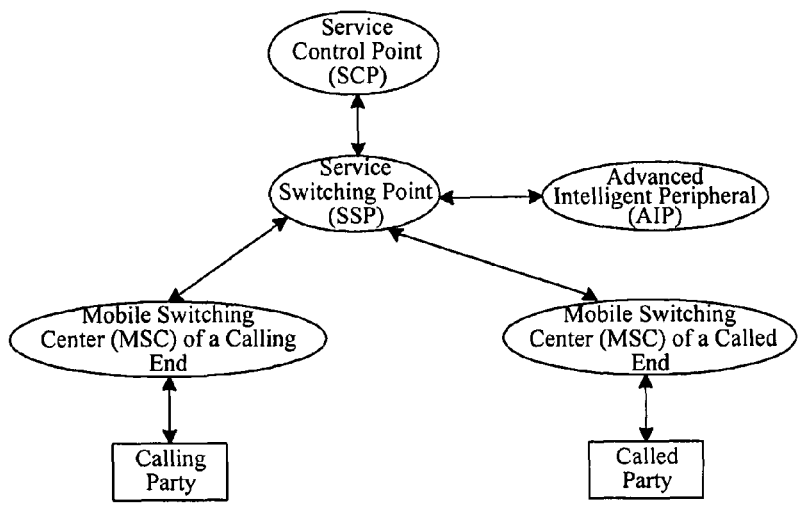
FIG. 4 is a schematic flow chart of a non-voice channel alternative calling method of a ring back tone in the prior art.
Figure 5:
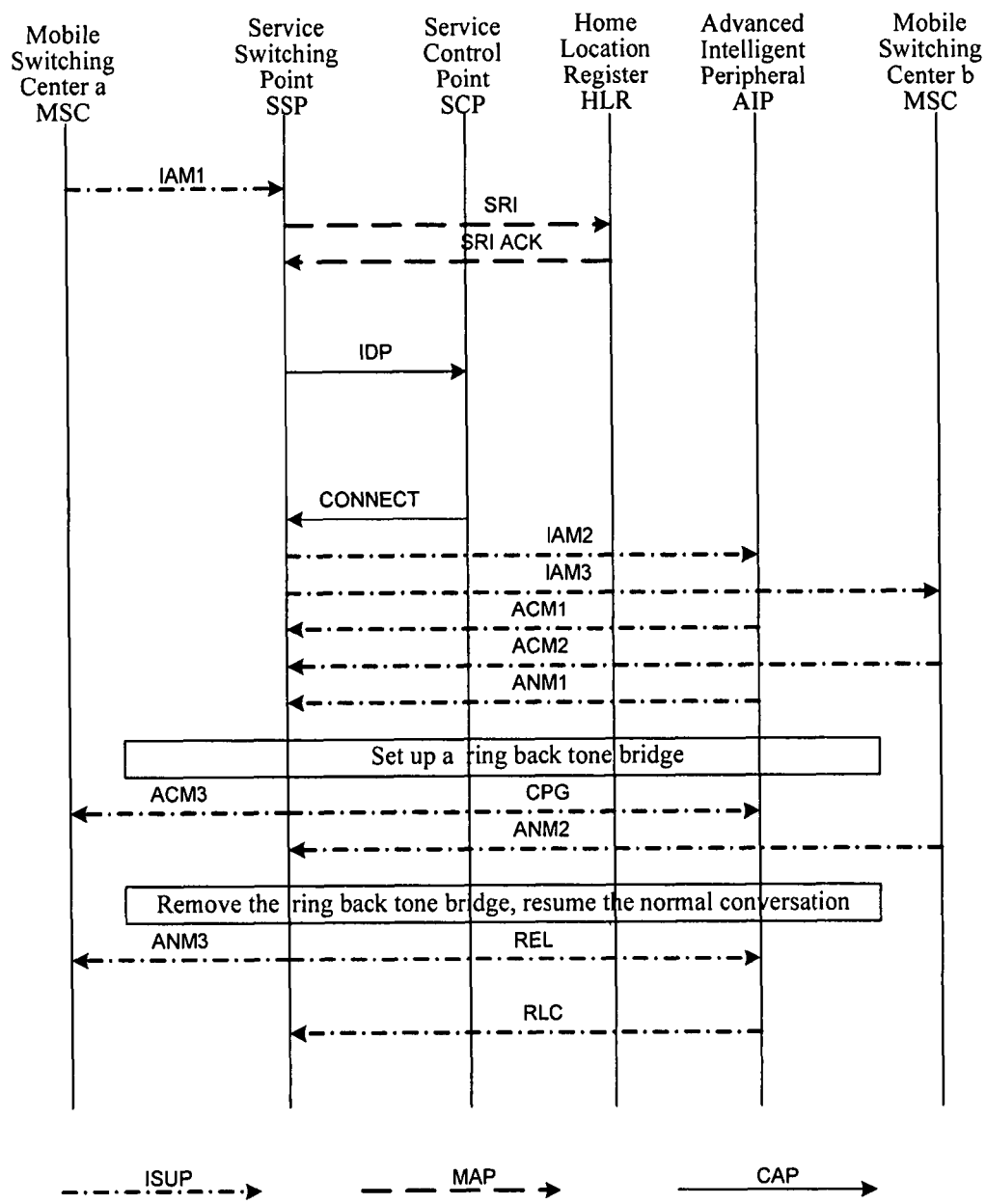
FIG. 5 is a schematic diagram of non-voice channel alternative calling signaling interactions of a ring back tone in the prior art.
Figure 6:
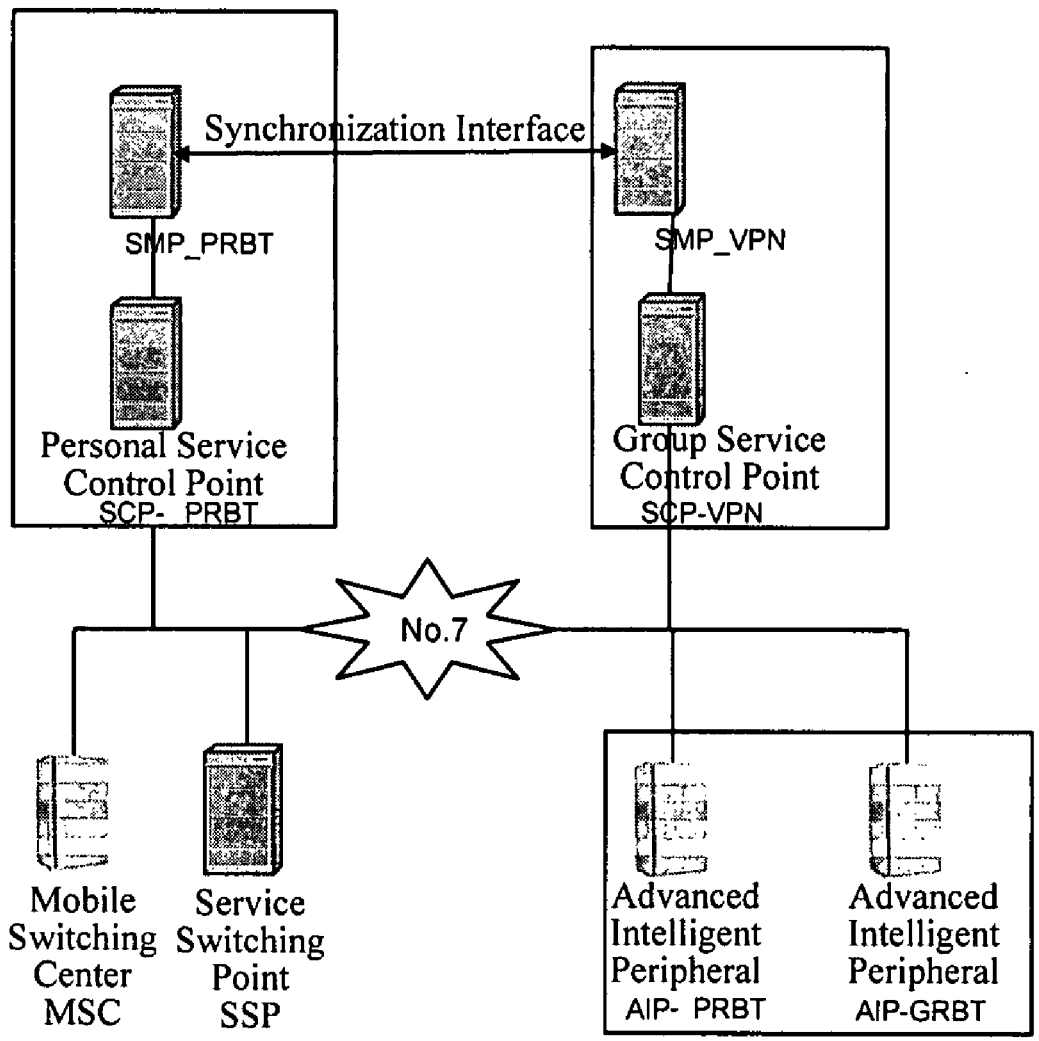
FIG. 6 is a schematic diagram of a system networking employing a synchronization interface according to an embodiment of the present invention.

In consideration of the Mobile Intelligent Network which provides a personal ring back tone service, some embodiments of the present invention provide a group ring back tone service for a group subscriber and the network system frame is shown in FIG. 6. The network system includes: a Service Switching Point (SSP), for triggering an intelligent service request; a Service Control Point, for processing the intelligent service request; and an Advanced Intelligent Peripheral (AIP), for playing a ring back tone. The Service Control Point may include an SCP-PRBT (Service Control Point-Personal Ring Back Tone) and an SCP-VPN (Service Control Point-Virtual Private Network). The SCP-PRBT has personal ring back tone information stored therein, while the SCP-VPN has group ring back tone information stored therein. The SCP-PRBT and SCP-VPN may be integrated, so that the network devices need not be rebuilt.

Sometimes a personal ring back tone subscriber may also be a group service subscriber, and the subscriber's personal ring back tone should still be kept valid. In such a case, a communication interface may be added between the SCP-PRBT which stores the personal ring back tone information and SCP-VPN which stores the group ring back tone information. The communication interface may be a synchronization interface for synchronizing the personal ring back tone information on the SCP-PRBT to the SCP-VPN. As can be seen in FIG. 6, when a subscriber activates or cancels a personal ring back tone service, the information is synchronized to an SMP-VPN for managing group ring back tone services via an SMP-PRBT for managing personal ring back tone services, and the SMP-VPN updates the data to the SCP-VPN. However, the communication interface may also be a query interface used by the SCP-VPN to send a query request to the SCP-PRBT, so as to obtain the personal ring back tone information.

In FIG. 6, the Advanced Intelligent Peripheral (AIP) may play a personal ring back tone as well as a group ring back tone. Of course, two independent Advanced Intelligent Peripherals may also be employed for playing the personal ring back tone and the group ring back tone respectively.

The group ring back tone is mainly realized in VPN signaling. Hereinafter, the embodiments of the invention will be described with reference to the following three cases: an individual user does not customize a personal ring back tone, while a group which the individual user belongs to has customized a group ring back tone; an individual user has customized a personal ring back tone and a group which the individual user belongs to has customized a group ring back tone; an individual user has customized a personal ring back tone, while a group which the individual user belongs to does not customize a group ring back tone.

Figure 7:
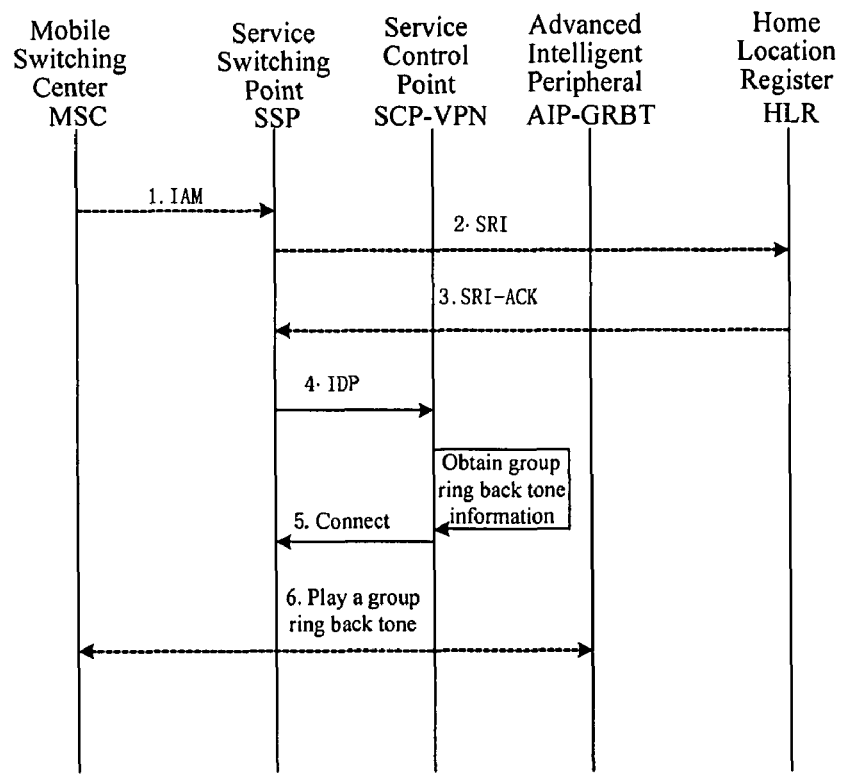
FIG. 7 is a schematic diagram of signaling interaction according to an embodiment of the present invention.

With regard to the case in which an individual user does not customize a personal ring back tone, while a group which the individual user belongs to has customized a group ring back tone, the signaling interactions thereof are shown in FIG. 7.

Process 1: A user calls a VPN user. An MSC of the calling party sends an IAM message to connect the call to an SSP based on the number segment or T-CSI of the called party.

Process 2: The SSP sends a Send Routing Information (SRI) message to a Home Location Register of the called party.

Process 3: The Home Location Register returns a Send Routing Information acknowledge (SRI-ACK) message. The SSP obtains location information of the called party.

Process 4: The SSP triggers an intelligent service request by sending an IDP message to an SCP-VPN of a group which the called party belongs to.

Upon receiving the message sent by the SSP, the SCP-VPN queries about group ring back tone information and personal ring back tone information and obtains the group ring back tone information, without the personal ring back tone information.

Process 5: The SCP-VPN sends a Connect message (i.e., connection number) carrying the group ring back tone information to the SSP.

Process 6: The SSP routes the call to an AIP-GRBT and the AIP-GRBT plays the group ring back tone to the calling party; when the call is answered, the ring back tone is stopped and the call is connected.

In Process 6, the voice channel alternative calling process of the ring back tone and the signaling processing are the same as those in the prior art, which are shown in FIGS. 2, 3, 4 and 5 and will not be described again here.

Figure 8:
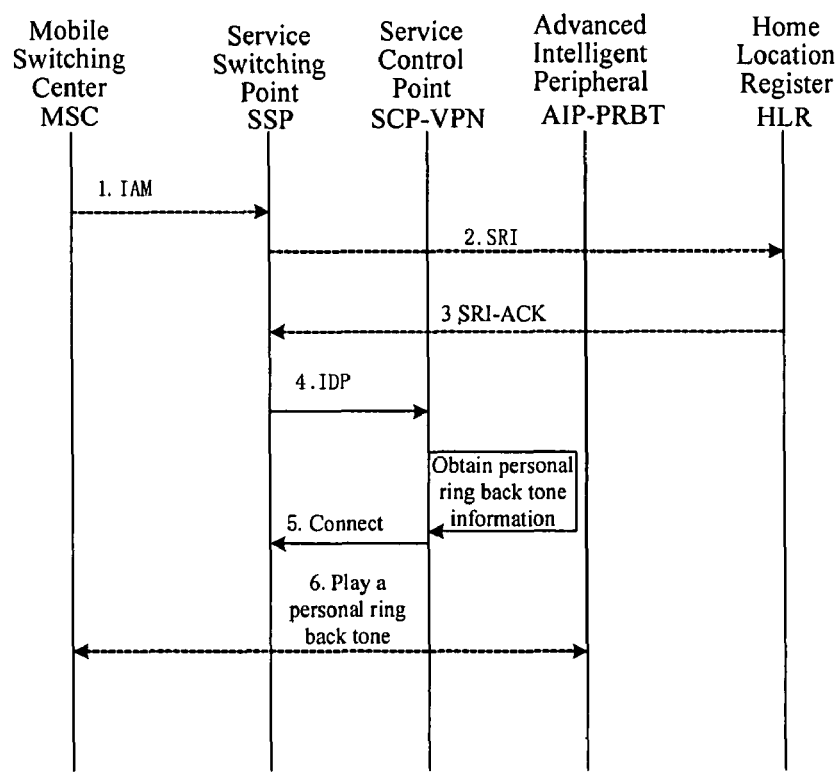
FIG. 8 is a schematic diagram of signaling interaction according to another embodiment of the present invention.

With regard to the case in which an individual user has customized a personal ring back tone, while a group to which the individual user belongs does not customize a group ring back tone, the signaling interactions thereof are shown in FIG. 8.

Process 1: A user calls a VPN user who has customized a ring back tone service. An MSC of the calling party sends an IAM message to connect the call to an SSP based on the number segment or T-CSI of the called party.

Process 2: The SSP sends an SRI message to a Home Location Register of the called party.

Process 3: The Home Location Register returns an SRI-ACK message. The SSP obtains location information of the called party.

Process 4: The SSP triggers an intelligent service request by sending an IDP message to an SCP-VPN of a group which the called party belongs to.

Upon receiving the message sent by the SSP, the SCP-VPN queries about group ring back tone information and personal ring back tone information and obtains the personal ring back tone information, without the group ring back tone information.

Process 5: The SCP-VPN sends a Connect message (i.e., connection number) carrying the personal ring back tone information to the SSP.

Process 6: The SSP routes the call to an AIP-PRBT and the AIP-PRBT plays the personal ring back tone to the calling party; when the call is answered, the ring back tone is stopped and the call is connected.

In Process 6, the voice channel alternative calling process of the ring back tone and the signaling processing are the same as those in the prior art, which are shown in FIGS. 2, 3, 4 and 5 and will not be described again here.

Figure 9:
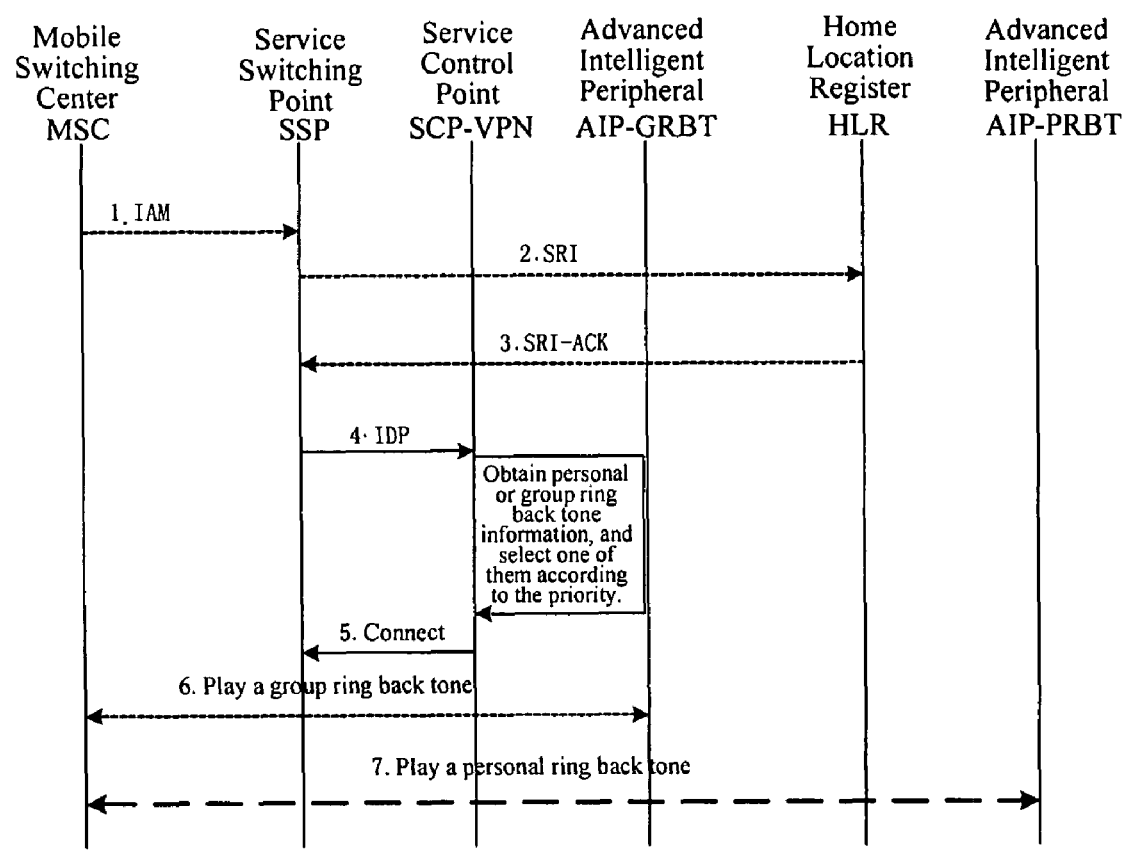
FIG. 9 is a schematic diagram of signaling interaction according to another embodiment of the present invention.

With regard to the case in which an individual user has customized a personal ring back tone and a group which the individual user belongs to also has customized a group ring back tone, the signaling interaction diagram thereof is shown in FIG. 9.

Process 1: A user calls a VPN user who has customized a ring back tone service. An MSC of the calling party sends an IAM message to connect the call to an SSP based on the number segment or T-CSI of the called party.

Process 2: The SSP sends an SRI message to a Home Location Register of the called party.

Process 3: The Home Location Register returns an SRI-ACK message. The SSP obtains location information of the called party.

Process 4: The SSP triggers an intelligent service request by sending an IDP message to an SCP-VPN of a group which the called party belongs to.

Upon receiving the message sent by the SSP, the SCP-VPN queries about group ring back tone information and personal ring back tone information synchronized from an SCP-PRBT The SCP-VPN obtains the personal ring back tone information and the group ring back tone information, and then selects to play the personal ring back tone or the group ring back tone according to a preset ring back tone priority.

Process 5: If the personal ring back tone information is selected according the priority, a Connect message (i.e., connection number) carrying the personal ring back tone information is sent to the SSP and Process 7 will be performed. If the group ring back tone information is selected according the priority, a Connect message (i.e., connection number) carrying the group ring back tone information is sent to the SSP and Process 6 will then be performed.

The ring back tone priority may be preset according to a time interval, a calling number, a called number or other information, or a combination thereof. For example, when preset according to a time interval, the group ring back tone may have a higher priority during working hours, while the personal ring back tone may have a higher priority during non-working hours. As another example, during working hours, the personal ring back tone may have a higher priority for certain calling numbers.

Process 6: If the group ring back tone information is carried in the Connect message, the call is routed to the AIP-GRBT, and the group ring back tone is played to the calling party; when the call is answered, the ring back tone is stopped and the call is connected.

Process 7: If the personal ring back tone information is carried in the Connect message, the call is routed to the AIP-PRBT, and the personal ring back tone is played to the calling party; when the call is answered, the ring back tone is stopped and the call is connected.

In Process 6 and Process 7, the voice channel alternative calling process of the ring back tone and the signaling processing are the same as those in the prior art, which are shown in FIGS. 2, 3, 4 and 5 and will not be described again here.

Implementing group ring back tone according to some embodiments of the invention brings advantages of ring back tone service for a group subscriber and individual user within the group. As a group ring back tone subscriber customizes a uniform group ring back tone for all of the members within the group, the group ring back tone service may provide a friendly ring back tone to the outside and propagate new businesses in time, thus producing a good advertising effect. For example, the group subscriber may customize a friendly welcome voice, such as an introduction of the company or an introduction of new products as the ring back tone; as the group number is dialed, the corresponding group ring back tone will be heard. By means of the group ring back tone, the corporate image may be well promoted, or new products may be recommended. When a group subscriber does not customize a group ring back tone, while a user within this group has applied for a personal ring back tone, the personal ring back tone also will be applicable as well.

It is obvious to the skilled in the art that various changes and modifications may be made to the present invention without departing from the spirit and scope of the present invention, and it is intended that the present invention covers these changes and modifications provided that they fall within the scope of the present invention as defined by the appended claims and their equivalents.

What is claimed is:

1. A method for obtaining a ring back tone, the method comprising:
   receiving, by a first Service Control Point (SCP), an intelligent service request triggered by a Service Switching Point (SSP), based on a call of a calling party to a called party;
   querying for personal ring back tone information of the called party and group ring back tone information of a group to which the called party belongs;
   obtaining both or a one of the personal ring back tone information and the group ring back tone information;
   if both of the personal ring back tone information and the group ring back tone information are obtained, selecting as a ring back tone information either the obtained personal ring back tone information or the obtained group ring back tone information according to a preset ring back tone priority, and delivering a connect message comprising the selected ring back tone information to the SSP; and
   if only one of the personal ring back tone information and the group ring back tone information is obtained, delivering a connect message comprising either the obtained personal ring back tone information or the obtained group ring back tone information to the SSP.

2. The method according to claim 1, wherein the preset ring back tone priority comprises at least one of a time interval, a calling number and a called number.

3. The method according to claim 1, wherein querying for personal ring back tone information and group ring back tone information comprises:
   querying for the personal ring back tone information from the first SCP, and querying for the group ring back tone information via a communication interface between the first SCP and the second SCP.

4. The method according to claim 3, wherein the communication interface is a one of query interface and synchronization interface.

5. A system for obtaining a ring back tone, comprising:
   a Service Switching Point (SSP), configured to trigger an intelligent service request to a first Service Control Point based on a call of a calling party to a called party; and
   the first Service Control Point (SCP), configured to receive the intelligent service request, and query for personal ring back tone information of the called party and group ring back tone information of a group to which the called party belongs, obtain both or a one of the personal ring back tone information and the group ring back tone information; if both of the personal ring back tone information and the group ring back tone information are obtained, select as a ring back tone information either the obtained personal ring back tone information or the obtained group ring back tone information according to a preset ring back tone priority, and deliver a connect message comprising the selected ring back tone information to the SSP; and if only one of the personal ring back tone information and the group ring back tone information is obtained, deliver a connect message comprising either the obtained personal ring back tone information or the obtained group ring back tone information to the SSP.

6. The system according to claim 5, wherein the preset ring back tone priority comprises at least one of a time interval, a calling number and a called number.

7. The system according to claim 5, the first SCP configured to query for personal ring back tone information and group ring back tone information comprising:
   the first SCP configured to query for the personal ring back tone information from the first SCP, and query for the group ring back tone information via a communication interface between the first SCP and the second SCP.

8. A service control device, comprising:
   a receiving unit configured to receive an intelligent service request triggered by a Service Switching Point (SSP) based on a call of a calling party to a called party;
   a querying unit configured to query for personal ring back tone information of the called party and group ring back tone information of a group to which the called party belongs;

an obtaining unit configured to obtain both or a one of the personal ring back tone information and the group ring back tone information; and a selecting unit configured to select a ring back tone information either the personal ring back tone information or the group ring back tone information according to a preset ring back tone priority if both of the personal ring back tone information and the group ring back tone information are obtained.

9. The device according to claim 8, further comprising a priority storage unit configured to store ring back tone priority information customized by the called party.

10. The service control device according to claim 8, wherein the preset ring back tone priority comprises at least one of a time interval, a calling number and a called number.

* * * * *